United States Patent
Dickenson et al.

(10) Patent No.: US 9,645,655 B2
(45) Date of Patent: May 9, 2017

(54) INTEGRATED TOUCHPAD AND KEYBOARD

(71) Applicant: International Business Machines Corporation, Armonk, NY (US)

(72) Inventors: Gary I. Dickenson, Tucson, AZ (US); Richard Hutzler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 13/853,779

(22) Filed: Mar. 29, 2013

(65) Prior Publication Data

US 2014/0292660 A1    Oct. 2, 2014

(51) Int. Cl.
*G06F 3/02* (2006.01)

(52) U.S. Cl.
CPC .................... *G06F 3/021* (2013.01)

(58) Field of Classification Search
CPC ........... G06F 3/021; G06F 3/045; G09G 5/00; G09G 3/02
USPC .................. 345/168, 174, 173, 156; 341/34; 178/18.05
See application file for complete search history.

(56) References Cited

U.S. PATENT DOCUMENTS

| | | | |
|---|---|---|---|
| 5,568,987 A | 10/1996 | Franz | |
| 5,666,113 A * | 9/1997 | Logan | G06F 3/0488 341/22 |
| 5,691,716 A | 11/1997 | Crowley et al. | |
| 6,100,875 A | 8/2000 | Goodman et al. | |
| 6,288,707 B1 * | 9/2001 | Philipp | 345/168 |
| 7,358,956 B2 | 4/2008 | Hinckley et al. | |
| 7,884,806 B2 | 2/2011 | Trent, Jr. | |
| 2006/0232557 A1 * | 10/2006 | Fallot-Burghardt | 345/168 |
| 2007/0091070 A1 * | 4/2007 | Larsen | G06F 3/0213 345/168 |
| 2008/0246723 A1 * | 10/2008 | Baumbach | G06F 3/03547 345/156 |
| 2010/0206643 A1 * | 8/2010 | Steeves | G06F 3/03547 178/18.05 |
| 2012/0127124 A1 * | 5/2012 | Zanone et al. | 345/174 |

* cited by examiner

*Primary Examiner* — Carolyn R Edwards
*Assistant Examiner* — Yuk Chow
(74) *Attorney, Agent, or Firm* — Robert J. Shatto

(57) ABSTRACT

A method and apparatus is provided for implementing integrated keys on a user input device. In one embodiment, the method includes detecting an initial input in either a first or second proximity sensor device. The first proximity sensor device may be integrated into a first key of the user input device and the second proximity sensor device may be integrated into a second key of the user input device that is proximate to the first key. The method may further include starting a first timer upon sensing the initial input. The method may further activate one of a first input mode or second input mode. The first input mode may be activated absent detection of a key input before the first timer expires. The second input mode is activated if a key input is detected before the first timer expires.

16 Claims, 3 Drawing Sheets

INTEGRATED TOUCHPAD AND KEYBOARD

TECHNICAL FIELD

Embodiments described herein generally relate to electronic devices, and more specifically to proximity sensor devices and keyboards.

BACKGROUND

A user interface for an electronic device may be defined as the elements, aspects, or parts of the electronic device where interaction between a human or user and the electronic device occurs. The goal of this interaction may be the effective operation and control of the electronic device on the user's end, and may include feedback from the machine, which may aid the user in making operational decisions. Broad examples of this concept of user interface include the interactive aspects of computer operating systems and process controls hardware. A specific example of this concept may include a keyboard, mouse, or a touch screen. The user interface in electronic devices may include the use of hardware or software components. Generally, the goal of this human-electronic device interaction is to produce a user interface which makes it easy, efficient, and enjoyable to operate a machine in the way which produces the desired result. This may generally mean that the operator needs to provide minimal input to achieve the desired output, and also that the machine minimizes undesired outputs to the human.

SUMMARY

A method and apparatus is provided for implementing integrated keys on a user input device. In one embodiment, the method includes detecting an initial input in either a first or second proximity sensor device. The first proximity sensor device may be integrated into a first key of the user input device and the second proximity sensor device may be integrated into a second key of the user input device that is proximate to the first key. The method may further include starting a first timer upon sensing the initial input. The method may further activate one of a first input mode or second input mode. The first input mode may be activated absent detection of a key input before the first timer expires. The second input mode is activated if a key input is detected before the first timer expires.

In one embodiment, the apparatus may include a first key of a user input device integrated with a first proximity sensor device. The apparatus may further include second key of the user input device, that is proximate to the first key, integrated with a second proximity sensor device. The apparatus may also include a first timer that starts upon detecting an initial input in either the first or second proximity sensor devices. A first input mode may be activated absent the detection of a key input before the first timer expires. A second input mode may be activated if there is a key input detected before the first timer expires.

BRIEF DESCRIPTION OF THE DRAWINGS

In the Figures and the Detailed Description, like numbers refer to like elements.

DETAILED DESCRIPTION

Figure 1:
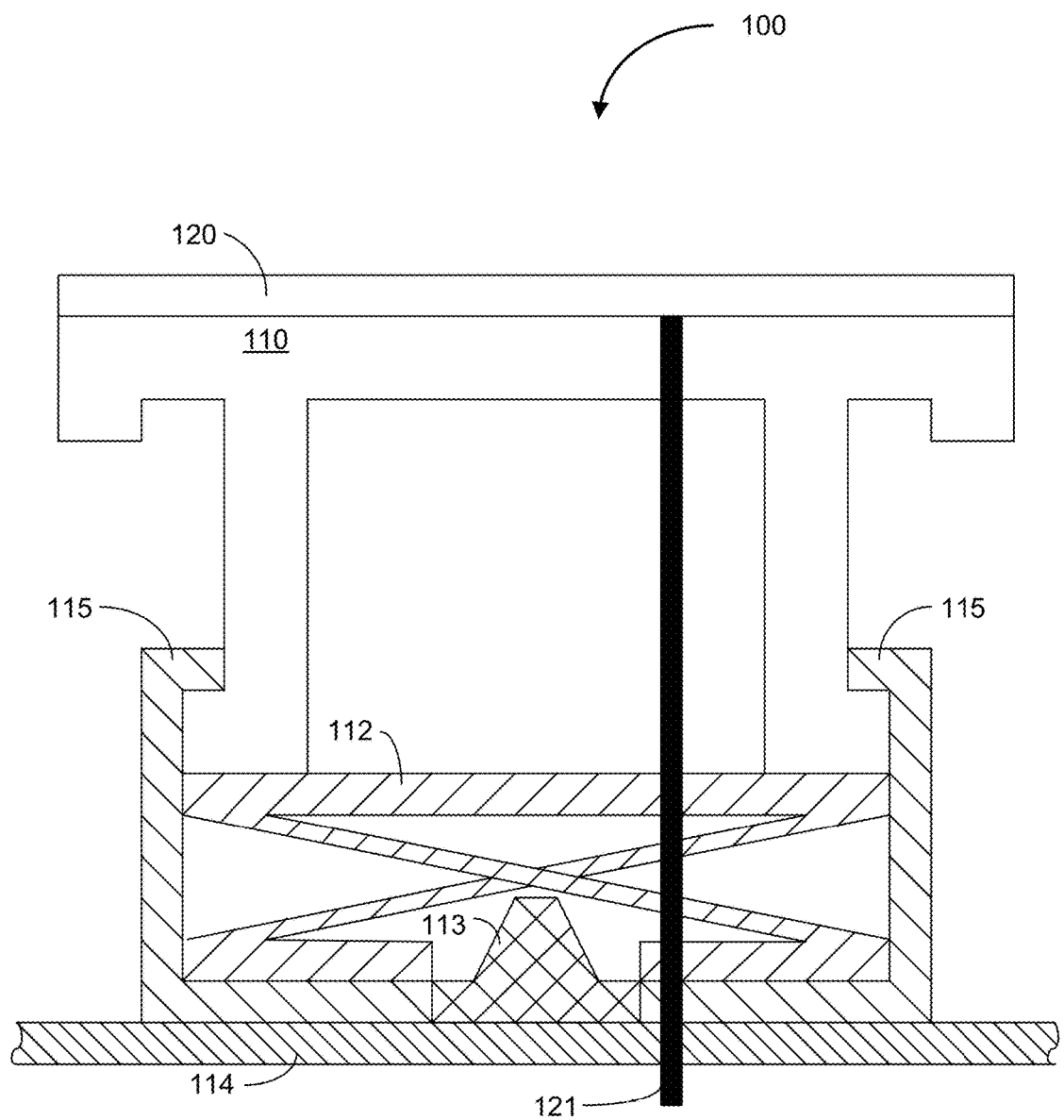
FIG. 1 is a cross-sectional side view of an integrated key with a proximity sensor device integrated into it, according to an embodiment of the invention.

Electronic devices often have one or more user input devices. The user input devices may allow a user to interface with the electronic device. In electronic devices two common types of user input devices are a keyboard and a proximity sensor device. Both of these may be part of the overall user interface of an electronic device that may enable the user to input information into the electronic device. In electronic devices, a keyboard is a typewriter-style device, which uses an arrangement of buttons or keys, to act as mechanical levers or electronic switches. Proximity sensor devices may also commonly be referred to as touch pad or touch sensor device. These proximity sensor devices typically include a sensing region, often demarked by a surface, which uses capacitive, resistive, inductive, optical, acoustic, or other technology to determine the presence, location or motion of one or more appendages, styli, or other objects.

The keyboard typically has characters engraved or printed on the keys and each press of a key typically corresponds to a single written symbol. However, to produce some symbols requires pressing and holding several keys simultaneously or in sequence. While most keyboard keys produce letters, numbers or signs (characters), other keys or simultaneous key presses can produce actions or computer commands. In some instances a single key may be used for several symbols and the symbol selected by the user is based off a series or combination of key presses of a single key.

The proximity sensor device, together with finger(s) or other object(s), can be used to provide an input to an electronic device or system. For example, proximity sensor devices may be used as input devices for larger computing systems, such as those found integral with notebook computers or peripheral to desktop computers. Proximity sensor devices are also used in smaller devices or systems, including but not limited to: handheld systems such as personal digital assistants (PDAs), remote controls, electronic tablets, and communication systems such as wireless telephones and text messaging systems. Increasingly, proximity sensor devices are used in media systems, such as CD, DVD, MP3, video or other media recorders or players. Proximity sensor devices may function as a value adjustment device, cursor control device, selection device, scrolling device, graphics/character/handwriting input device, menu navigation device, gaming input device, button input device, keyboard or other input device.

In various embodiments of the presented invention, a series of proximity sensor devices may, as a group, have an input mode in which they act as a specified input device. For example, a group of proximate proximity sensor devices may in an input mode be combined to act as one large touchpad. In another example, a series of proximate proximity sensor devices may have an input mode where they are combined to act a scrolling device. In various embodiments, groups of proximity sensor devices may have modes where they function as a value adjustment device, cursor control device, selection device, scrolling device, graphics/character/handwriting input device, menu navigation device, gaming input device, button input device, keyboard or other input device. In various embodiments, the proximity sensor device may be proximate with each other by being adjacent to each other.

An advantage of embodiments of the invention is the possible reduction in space for peripheral devices to be built into or attached to electronic systems. For example, it may remove the need for additional keys to select functions for the integrated keys. The integrated keys themselves reduce the possible need to allocate space to a touchpad or scrolling device on an electronic device. Many such electronic devices may be designed to be small such as phones and laptops. For such devices the space additional input devices take up may be burdensome.

FIG. 1 is a cross sectional side view of an integrated key 100 of a keyboard with a proximity sensor device 120 integrated into it, according to an embodiment of the invention. The embodiment of the integrated key 100 may have elements including the keytop 110, housing 115, contact-spring element 112, switch-membrane 113, and contact-switch membrane sheet 114. The integrated key 100 may also include proximity sensor device 120 and a communication wire 121.

The integrated key 100 works when pressure is applied downwardly on the keytop 110. The keytop then moves down in the housing 115, compressing the contact-spring element 112. The contact-spring element 112 compresses the switch-membrane 113 as it moves downward. The switch-membrane may close a switch in the contact-switch membrane sheet 114 which may relay the input from the integrated key 100 to the electronic device in communication with the integrated key 100. Once the downward pressure is removed the contact-spring element 112 may return to a default open position, moving the keytop 110 upward to the original position. Various embodiments of integrated keys 100 that may be used may add or remove various elements shown. It is contemplated that a variety of integrated keys 100 may possibly be used and be within the scope of the invention.

The proximity sensor device 120 may be of any type previously mentioned. For example, the proximity sensor device may be a capacitive type. The proximity sensor device 120 may be integrated by applying it to the top of the integrated key 100 on the contact surface of the keytop 110. In various embodiments, the proximity sensor device 120 may be attached with an adhesive such as an epoxy or glue. In various other embodiments, the proximity sensor device 120 may be molded into, snapped, or mechanically attached to the keytop 110. In other embodiments, the proximity sensor device 120 may be integrated using a keyboard cover or overlay device. In the shown embodiment the communication wire 121 for the proximity sensor 120 is made to pass through the integrated key 100 and out the backside or bottom of the integrated key 100 to relay the input from the proximity sensor 120 to the electronic device in communication with the proximity sensor 120. In various other embodiments, the communication may be accomplished with multiple communication wires 121. In various other embodiments, the communication may be accomplished with no communication wires 121, for example, by wireless communication. In various embodiments, the wire routing, location, and types may vary from the embodiment shown.

Figure 2:
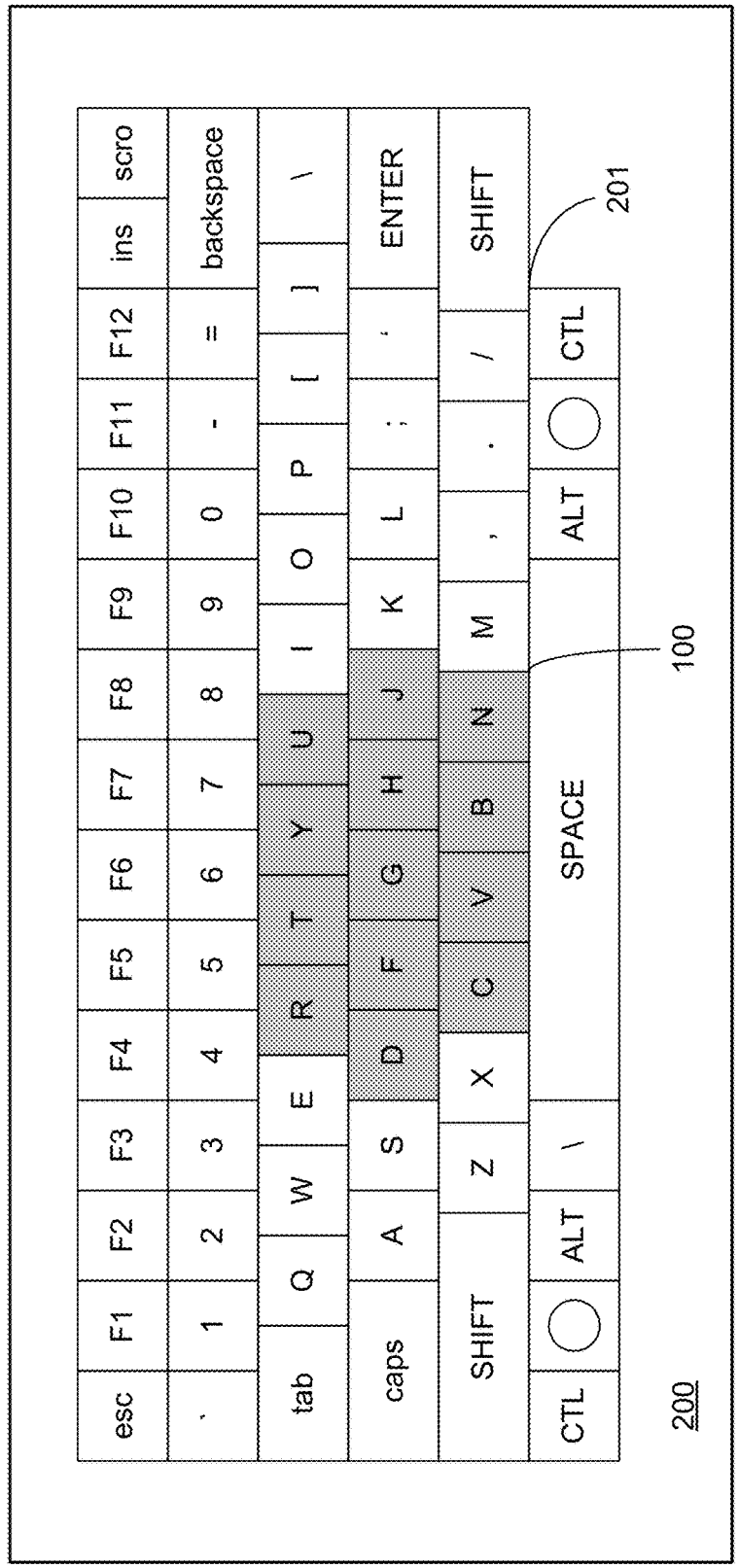
FIG. 2 is a schematic representation of a keyboard with a group of proximate integrated keys, according to an embodiment of the invention.

FIG. 2 is a schematic representation of a keyboard 200 with a group of proximate integrated keys 100, according to an embodiment of the invention. In the embodiment, the keyboard 200 may be part of, in contact with, or in communication with an electronic device. The embodied keyboard may include a variety of standard keys 201 used for inputting the symbol marked upon them when pressed. The keyboard 200 may also include a group of proximate integrated keys 100 having integrated proximity sensor devices. In various embodiments, the number, selection, and location of proximate integrated keys 100 may vary. In various embodiments, the integrated keys 100 may be proximate to each other by being adjacent. These integrated keys may work as standard keys 201 previously described above. For example, when pressed the integrated keys 100 may act like the standard keys 201 by inputting the symbol marked upon them.

In various embodiments, the proximate integrated keys 100 having integrated proximity sensor devices 120 may also have an input mode in which they act as a specified input device. For example, the proximate integrated keys 100 may in one input mode act as a cursor input or scroll input by combining and using the input from integrated proximity sensor device 120 of each integrated key 100. Hardware or software may be used to determine the specified input device that the proximity sensor devices may act like. In various embodiments, the inputs from each proximity sensor device 120 may be combined into a single input to an electronic device. In these various embodiments, the integrated keys may be considered to have two input modes. In the first input mode, the inputs of the proximity sensors devices 120 may be treated as a specified input device. In the second input mode, the integrated keys 100 may be treated as standard keys 201.

In the illustrated embodiment, the proximate integrated keys 100 may have an input mode where they act as a specified input device such as a touchpad when contact with one of the keys is made but the key is not pressed. This may be accomplished by the proximity sensor device 120 on each of these integrated keys 100 detecting the touch or presence of an object, such as a finger or stylus. In various embodiments, the direction and movement of the object may be determined by each individual proximity sensor device 120 or by order that the individual proximity sensors devices 120 of the proximate integrated keys 100 detect an object moving across them. The adjacent integrated key's 100 proximity sensor devices 120 may be used for any of the previously mentioned uses or inputs of such devices. In various embodiments, this use of the proximity sensor devices 120 may be enabled or disabled as described below.

Figure 3:
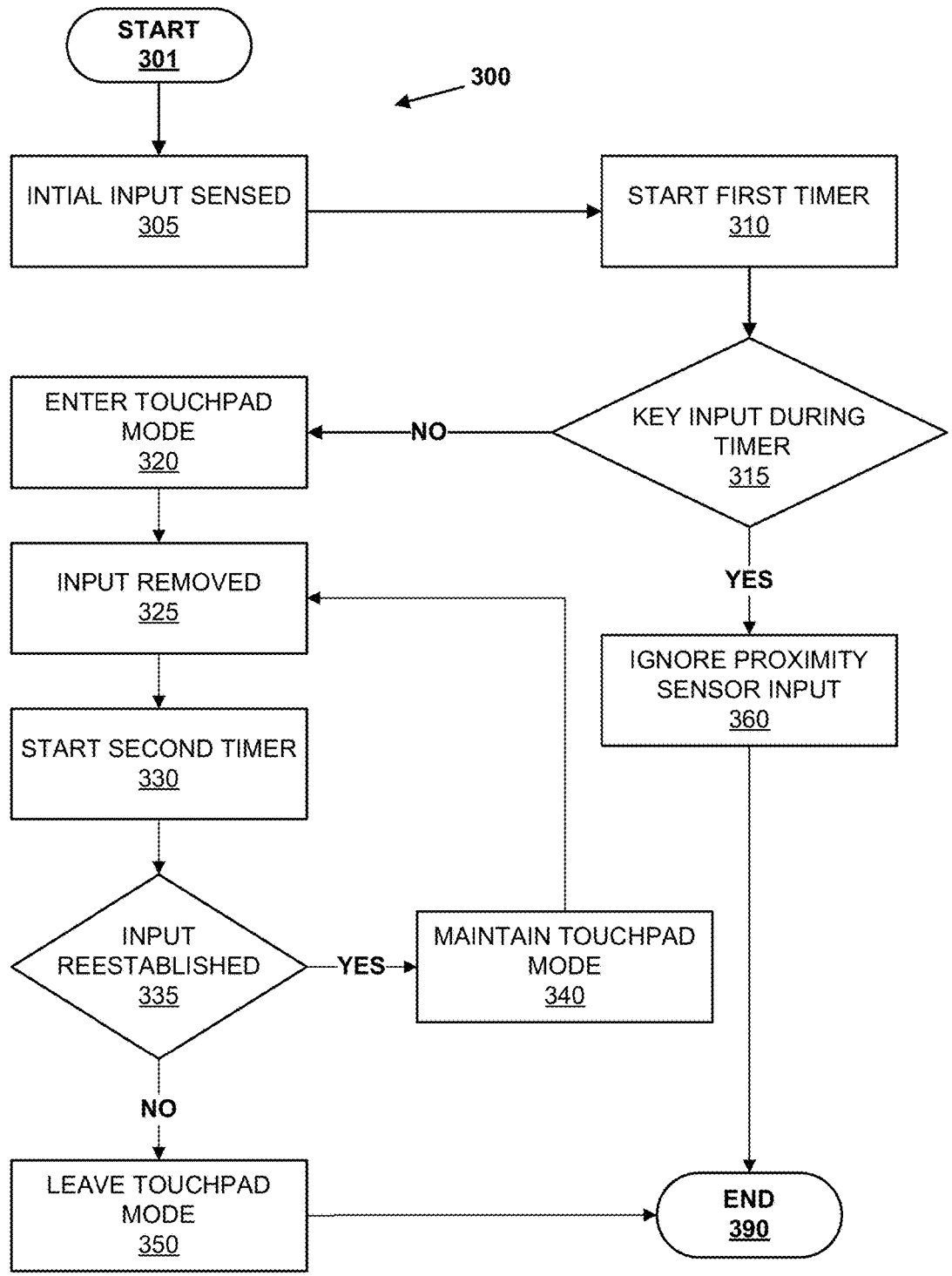
FIG. 3 is a flowchart of a method to use the proximate integrated keys, according to an embodiment of the invention.

FIG. 3 is a flowchart of a method 300 to use the proximate integrated keys 100 with proximity sensor devices, according to an embodiment of the invention. The method may be used by a keyboard 200 with proximate integrated keys 100 to determine when to use input to the proximity sensor devices 120. The method 300 starts in block 301 and in block 305 when one of the proximity sensor devices on one of the proximate integrated keys 100 may detect an initial input such as contact. This initial input may be any of the sorts previously mentioned for the proximity sensor devices 120 such as a physical contact by a finger or styli. The initial input may include a continuation of input from the initial contact that created the initial input in block 305. For example, the movement of an appendage or styli across the one or more of the proximate sensors devices 120. With the initial input detected, the method may proceed to block 310.

In block 310 the method 300 may start a timer. The timer may be either mechanical, software, hardware, or a combination of these. For example, the timer may be software and set to have a run time of 10 ms. In this example the timer expires in 10 ms. With the timer started, the method may proceed to block 315. In block 315 it is determined if a key input occurs during the timer interval. The key input may be a typical use of a standard key 201 or the integrated keys 100. Detection of a key input may include the depression of one or more standard keys 201 or integrated keys 100 so as to activate the switch membrane 113. If a key input is detected during the timer interval, the method may proceed to block 360 where the method may ignore, disable, or deactivate the proximity sensor device 120 inputs. This may occur because the system may take the key input during the timer as a signal that the keyboard 200, including the proximate integrated keys 100, is being used for standard keyboard data entry. This determination by the system may be considered the selection of an input mode. For example, the selection or activation of a key input mode. In various embodiments, the key input may be from the integrated key 100 initially sensing the input, any of the proximate integrated keys 100, or any of the standard keys 201 of the keyboard. With input from the proximity sensor devices 120 now being ignored, the method may proceed to end at block 390. In various embodiments, the ignoring of the input from the proximity sensors 120 may be tied into a timer that resets with each keystroke on the keyboard 200. If no keystroke occurs within a required duration the system resets to block 301 and awaits any new input.

In an embodiment, when no key input occurs during the duration of the timer in block 315 the method may proceed to block 320. In block 320, the proximate integrated keys 100 may act as a specified input device. This may be considered by the system determining to use the integrated keys 100 for a different input mode than in block 360, i.e., the selection or activation of a specific input mode. In the illustrated embodiment the integrated keys 100 may enter, or act as, a touchpad in this input mode. In various embodiments, this may result in an input mode in which input to any of the proximate integrated keys 100 providing input to the system or electronic device are combined and treated as input from a specified input device. This specified input device may be any of the ones previously mentioned for the proximity sensor devices. For example, the proximate integrated keys 100 shown in FIG. 2 may be combined to create the effect of a single touchpad input. In another example a series of proximate integrated keys 100 may provide a scroll input as movement occurs over the proximate integrated keys 100.

Once the selected input mode, or touchpad mode in the example, has been activated in block 320, the system may remain in that state until the initial input is interrupted. For example, all contact is removed from any of the proximate integrated keys 100 in block 325. In various embodiments, the input may be considered interrupted once all input to any of the proximity sensors 120 is removed. In method 300, the interruption of input starts a second timer in block 330. The second timer may be either mechanical, software, hardware, or a combination of these. In block 335, it may be determined if a second input was detected during the timer period. In various embodiments, this may be considered reestablishment of input to one of the proximity sensor devices 120. For example, the timer may be software and set to have a run time of 10 ms. If a second input to the proximity sensor devices 120 is detected during the timer period the method may proceed to block 340. In block 340, active input mode is maintained and input from the proximity sensor devices 120 continues as discussed previously until input is again interrupted and the method returns to block 325.

In an embodiment, if the second input is not detected in block 335 the method 300 may proceed to block 350. In block 350 active input mode may be ended. For example the active input mode may be deactivated, ceased, disabled, or suspended. The method may then end at block 390. Touchpad mode is used for the purpose of example. In other embodiments, the input mode may be of a variety of purposes, setting, uses, or input emulations as previously mentioned. This input may be a function such as a value adjustment device, cursor control device, selection device, scrolling device, graphics/character/handwriting input device, menu navigation device, gaming input device, button input device, keyboard or other input device.

In various embodiments, variation in the input mode may result in a different result than provided in the examples above. In an embodiment, when the input mode is activated that uses the proximity sensing devices 120 the pressing of an integrated key may result in a selection input as opposed to removing the system from the active input mode. In these embodiments, the inputs from the integrated keys are treated as the inputs from a specified input device that is a mouse and provides for both the cursor movement input and the selection input of such a device. For example, the pressing of an integrated key may be treated as the pressing or clicking of a mouse button. In other embodiments, the active input mode may emulate a variety of functions and inputs as previously mentioned. For example, it may emulate a scrolling device with selection capabilities. In other embodiments, the active input mode may split a group of integrated keys into two or more specified input devices. In various embodiments, several set of integrated keys may used on a keyboard to either emulate different devices or offer alternative locations for input. For example, a keyboard may have a set of integrated keys on the right and left side to make use easier based on hand bias of an individual.

As will be appreciated by one skilled in the art, individual aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, individual aspects of the present invention may take the form of a computer program product embodied in one or more computer readable medium(s) having computer readable program code embodied thereon.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments, reference was made to the accompanying drawings (where like numbers represent like elements), which form a part hereof, and in which is shown by way of illustration specific exemplary embodiments in which the embodiments may be practiced. These embodiments were described in sufficient detail to enable those skilled in the art to practice the embodiments, but other embodiments may be utilized and logical, mechanical, electrical, and other changes may be made without departing from the scope of the embodiments. In the previous description, numerous specific details were set forth to provide a thorough understanding of embodiments. But, embodiments may be practiced without these specific details. In other instances, well-known circuits, structures, and techniques have not been shown in detail in order not to obscure embodiments.

What is claimed is:

1. A method for implementing integrated keys on a user input device, comprising:
   detecting an initial input in a first proximity sensor device integrated into a first key of the user input device, a second proximity sensor device integrated into a second key of the user input device that is proximate to the first key,
   wherein a first communication wire for the first proximity sensor device extends from a top portion of the first proximity sensor through the first key and out a bottom of the first key and a second communication wire for the second proximity sensor device extends from a top portion of the second proximity sensor through the second key and out a bottom of the second key, wherein the first communication wire and the second communication wire relay input from the first and second proximity sensors, respectively, to an electronic device in communication with the user input device;
   starting a first timer upon sensing the initial input;
   activating, after starting the first timer, one of a first input mode or second input mode, wherein the first input mode is activated based on no key input being detected before the first timer expires, and the second input mode is activated based on a key input being detected before the first timer expires;
   starting, after the first input mode is activated, a second timer when the initial input is interrupted while in the first input mode;
   determining if a second input is detected by the first or second proximity sensor devices after starting the second timer and before the second timer expires;
   maintaining the first input mode as active based on the second input being detected after starting the second timer and before the second timer expires; and
   ending the first input mode as active based on the second input not being detected after starting the second timer and before the second timer expires.

2. The method of claim 1, wherein in the first input mode the combined inputs from the first and second proximity sensor devices emulate an input of a specified input device.

3. The method of claim 2, wherein the emulated input of a specified input device is an input of a touchpad.

4. The method of claim 2, wherein the emulated input of a specified input device is an input of a scrolling device.

5. The method of claim 1, wherein the first and second proximity sensor devices are integrated to the top of the respective first and second keys.

6. The method of claim 1, wherein the initial input is a physical contact of an object to either the first or second proximity sensor devices.

7. The method of claim 1, further comprising:
   deactivating the first input mode upon a key input being detected from any integrated key.

8. The method of claim 1, wherein key inputs upon the integrated keys emulate an alternate input when the first input mode is active.

9. The method of claim 8, wherein the alternate input emulated is a selection input.

10. An apparatus for integrating keys on a user input device, comprising:
    a first key integrated of the user input device with a first proximity sensor device;
    a second key integrated of the user input device with a second proximity sensor device, the second key proximate to the first key, wherein a first communication wire for the first proximity sensor device extends from a top portion of the first proximity sensor through the first key and out a bottom of the first key and a second communication wire for the second proximity sensor device extends from a top portion of the second proximity sensor through the second key and out a bottom of the second key, wherein the first communication wire and the second communication wire relay input from the first and second proximity sensors, respectively, to an electronic device in communication with the user input device;
    a first timer that starts upon detecting an initial input in the first proximity sensor devices, wherein a first input mode is activated, after starting the first timer, based on no key input being detected before the first timer expires; and a second input mode is activated when there is a key input detected before the first timer expires;
    a second timer that starts if the initial input is interrupted, wherein the first activity mode is maintained if a second input is detected by any proximity sensor devices after starting the second timer and before the second timer expires; and
    ending of the first activity mode based on no detection of the second input to any of proximity sensor devices after starting the second timer and before the second timer expires.

11. The apparatus of claim 10, wherein in the first input mode the combined inputs from the first and second proximity sensor devices emulate an input of a specified input device.

12. The apparatus of claim 11, wherein the emulated input of a specified input device is an input of a touchpad.

13. The apparatus of claim 11, wherein the emulated input of a specified input device is an input of a scrolling device.

14. The apparatus of claim 10, wherein the first and second proximity sensor devices are integrated to the top of the respective first and second keys.

15. The apparatus of claim 10, wherein the initial input is a physical contact of an object to either the first or second proximity sensor devices.

16. The method of claim 10, further comprising:
    deactivating the first input mode upon a key input being detected from any integrated key.

* * * * *